United States Patent
Han et al.

(10) Patent No.: US 6,306,362 B1
(45) Date of Patent: Oct. 23, 2001

(54) ALUMINOSILICATE MOLECULAR SIEVE

(75) Inventors: Scott S. Han, Lawrenceville; David Owen Marler, Deptford; Louis Deane Rollmann, Morrestown; John L. Schlenker, Thorofare, all of NJ (US); Suzanne Elaine Schramm, Glen Mills, PA (US); Jeffrey Scott Beck, Burlington, NJ (US)

(73) Assignee: ExxonMobil Oil Corporation, Fairfax, VA (US)

( * ) Notice: Subject to any disclaimer, the term of this patent is extended or adjusted under 35 U.S.C. 154(b) by 0 days.

(21) Appl. No.: 08/810,391

(22) Filed: Mar. 3, 1997

Related U.S. Application Data
(60) Provisional application No. 60/020,602, filed on Jun. 26, 1996.

(51) Int. Cl.[7] .............................. C01B 39/04; C01B 39/48
(52) U.S. Cl. ............................................. 423/702; 423/718
(58) Field of Search ...................................... 423/702, 703, 423/704, 706, 713, 714, 715, 718

(56) References Cited

U.S. PATENT DOCUMENTS

| | | | |
|---|---|---|---|
| 4,556,549 | * 12/1985 | Valyocsik | 423/702 |
| 4,568,654 | * 2/1986 | Valyocsik | 423/702 |
| 4,576,805 | * 3/1986 | Chang et al. | 423/715 |
| 5,106,801 | * 4/1992 | Zones et al. | 423/718 |
| 5,334,367 | * 8/1994 | Rosinski et al. | 423/704 |
| 5,489,424 | 2/1996 | Balkus, Jr. | 423/702 |
| 5,830,429 | * 11/1998 | Balkus, Jr. et al. | 423/702 |
| 6,103,215 | * 8/2000 | Zones et al. | 423/702 |

FOREIGN PATENT DOCUMENTS

97/29046 * 8/1997 (WO).
97/46486 * 12/1997 (WO).

OTHER PUBLICATIONS

Balkus, Jr. et al., "Molecular Sieve Synthesis Using Metallocenes As Structure Directing Agents," Mat. Res. Soc. Symp., vol. 368, p. 369, 1995.*

Balkus, Jr. et al., "Synthesis and Characterization of UTD–1: a Novel Zeolite Molecular Sieve," ACS Petroleum Chemicals Preprints, vol. 40, p. 196, Apr. 1995.*

Balkus, Jr. et al., "The Synthesis of UTD–1, Ti–UTD–1 and Ti–UTD–8 Using Cp*2CoOH as a Structure Directing Agent," Stud. Surf. Sci. Catal., vol. 97, p. 519–25, 1995.*

Balkus, Jr. et al., "Synthesis and Characterization of UTD–1: A Novel Molecular Sieve," Synthesis of Porous Materials: Zeolites, Clays and Nanostructures, Edited by Kessler and Occelli, Marcel Dekker, Inc., New York, pp. 77–91, 1996.*

Lobo et al., "Characterization of the Extra–Large–Pore Zeolite UTD–1," J. Am. Chem. Soc., vol. 119, pp. 8474–8484, Sep. 1997.*

Balkus, Jr. et al., "The Synthesis and Characterization of UTD–1: The First Large Pore Zeolite Based on a 14–membered Ring System," Stud. Surf. Sci Catal., vol. 105, pp. 415–21, 1997.*

Zones et al, Provisional Application No. 60/019,413, filed Jun. 7, 1996.*

* cited by examiner

Primary Examiner—David R Sample

(57) ABSTRACT

The present invention is directed to a large-pore aluminosilicate molecular sieve comprising alumina and silica, where the ratio of $SiO_2/Al_2O_3$ ranges from about 75 to 600, and its method of preparation. The large-pore aluminosilicate molecular sieve of the present invention has the ability to catalyze reactions involving particularly bulky transition states or large molecules.

1 Claim, 3 Drawing Sheets

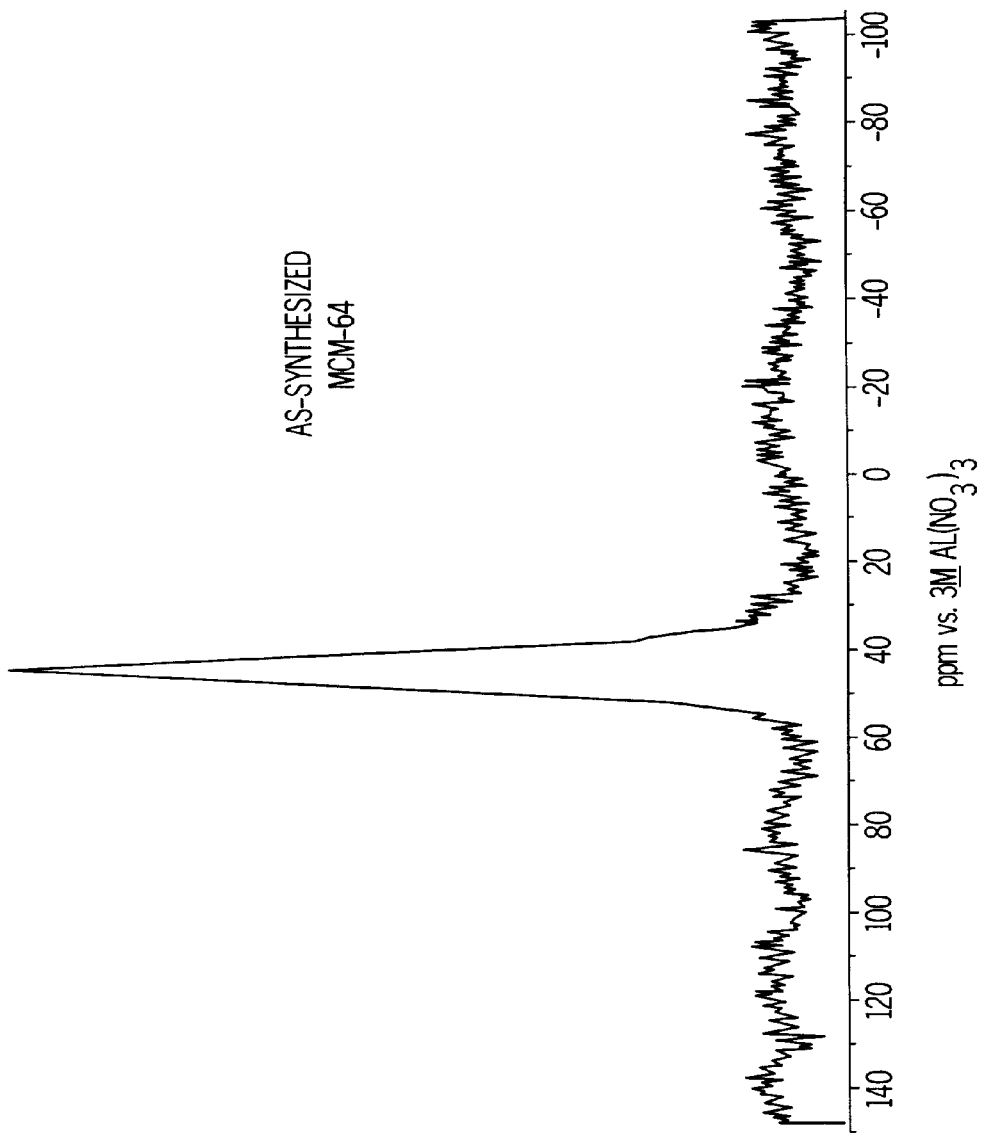

ALUMINOSILICATE MOLECULAR SIEVE

This application is a continuation-in-part of a Provisional Application, Serial No. 60/020,602, filed Jun. 26, 1996.

BACKGROUND OF THE INVENTION

A number of reactions involving bulky transition states or large molecules cannot be carried out using commercially available aluminosilicate zeolites, since the critical pore diameter of these aluminosilicate zeolites does not allow the facile ingress and egress of such molecules. As a result, reactions involving particularly bulky transition states or large molecules are often conducted using environmentally undesirable catalysts, such as chlorided alumina or liquid-phase acids, such as sulfuric acid.

A large-pore silica, 14-membered ring, molecular sieve was described for the first time by K. J. Balkus et al in "Synthesis and Characterization of UTD-1: A Novel Zeolite Molecular Sieve" in *ACS Petroleum Chemicals Preprints*, Volume 40, page 296 (1995), and "Molecular Sieve Synthesis Using Metallocenes as Structure Directing Agents" in *Mat. Res. Soc. Symp. Proc.*, Volume 368, page 369 (1995). Specifically, this large-pore silica molecular sieve is identified as UTD-1, a 14-membered ring, all-silica molecular sieve. UTD-1 is disclosed in U.S. Pat. No. 5,489,424.

In the article "Molecular Sieve Synthesis Using Metallocenes as Structure Directing Agents", K. J. Balkus, Jr. et al suggest incorporating aluminum into UTD-1 in an amount such that the Si/Al ratio is greater than 350 (corresponding to a $SiO_2/Al_2O_3$ ratio of greater than 700), to enhance the catalytic activity of UTD-1. However, the reference fails to describe or suggest the incorporation of greater amounts of alumina or the method by which aluminum is incorporated into the molecular sieve framework. To date, the synthesis of a large-pore, 14-membered ring, true aluminosilicate molecular sieve, namely a zeolite comprising alumina and silica, has not been reported.

The article further indicates that crystals of the UTD-1 silica molecular sieve are large "bundles of two dimensional planks . . . about 2 microns across."

SUMMARY OF THE INVENTION

The present invention is directed to a large-pore aluminosilicate molecular sieve, having a nominal critical pore diameter of about 7.5 Å, comprising alumina and silica, where the ratio of $SiO_2/Al_2O_3$ ranges from about 75 to 600, and its method of preparation. The large-pore aluminosilicate molecular sieve of the present invention has the ability to catalyze reactions involving particularly bulky transition states or large molecules, specifically, the conversion of toluene.

As used herein, the term "aluminosilicate molecular sieve" or "zeolite" refers to a molecular sieve having alumina and silica, which is substantially free of phosphorus and boron.

BRIEF DESCRIPTION OF THE DRAWINGS

FIG. 3 is an NMR spectrum that shows Al is in the framework of the molecular sieve of FIG. 1.

DETAILED DESCRIPTION OF THE INVENTION

Figure 1:
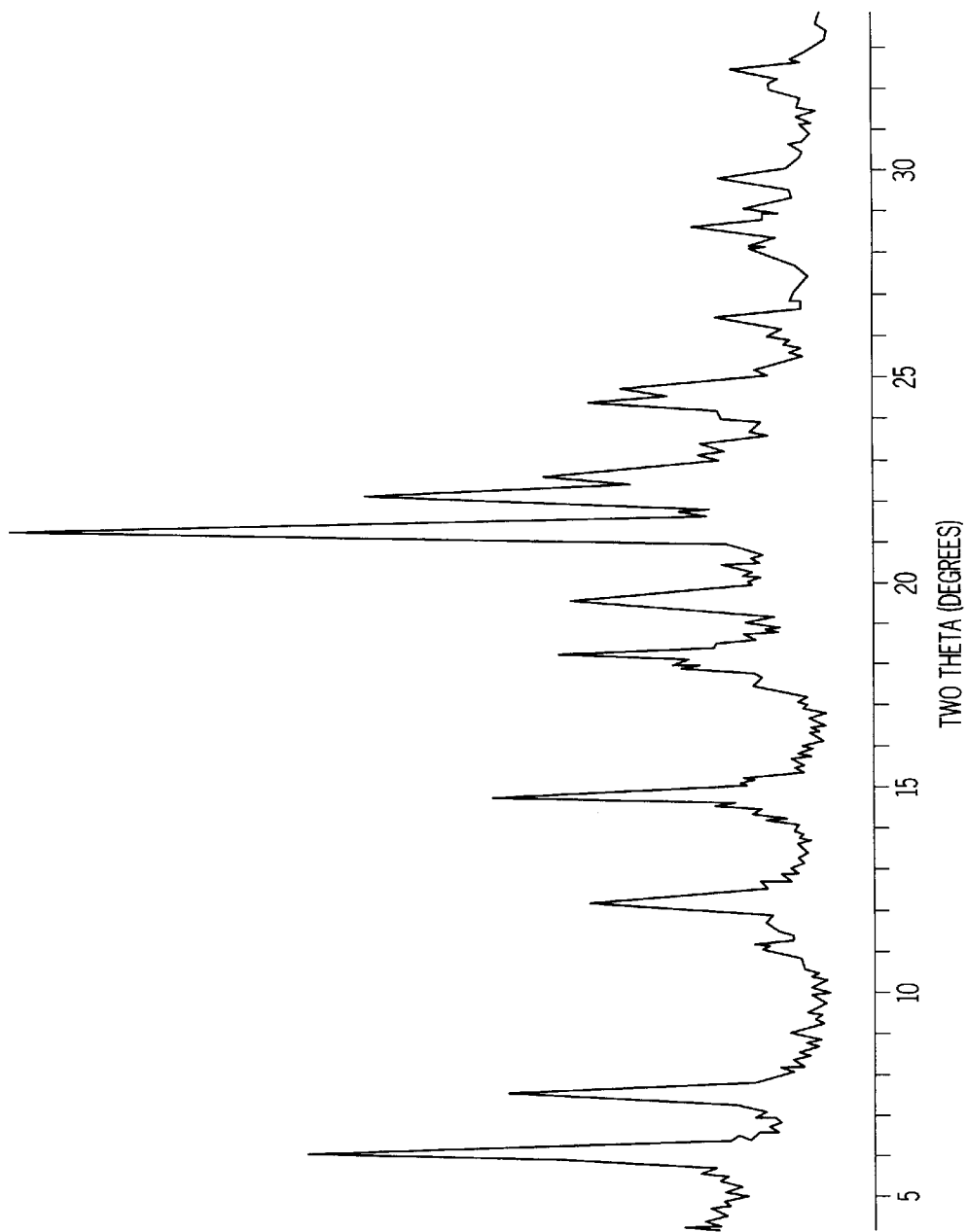
FIG. 1 is the X-ray diffraction pattern for the aluminosilicate molecular sieve of the present invention having a $SiO_2/Al_2O_3$ ratio of about 200, as-synthesized.

The present invention is directed to a novel large-pore aluminosilicate molecular sieve comprising alumina and silica, where the molecular sieve has an average crystal size of less than 2 microns; an "a" unit cell dimension of greater than 18.83 Å; and an x-ray diffraction pattern that includes at least the lines set forth in Table 1 below.

TABLE 1

MOST SIGNIFICANT XRD REFLECTIONS OF MCM-64

| Degrees Two-theta | d-spacing, in Å | Relative Intensity |
| --- | --- | --- |
| 6.0 | 14.70 ± 0.32 | S |
| 7.5 | 11.67 ± 0.40 | M |
| 14.6 | 6.09 ± 0.09 | M |
| 18.1 | 4.90 ± 0.11 | M |
| 19.6 | 4.53 ± 0.15 | M |
| 21.2 | 4.20 ± 0.04 | S |
| 22.0 | 4.04 ± 0.10 | M |

Table 2 shows additional lines of the x-ray diffraction pattern for the molecular sieve of the present invention.

TABLE 2

SIGNIFICANT XRD REFLECTIONS OF MCM-64

| Degrees Two-theta | d-spacing, in Å | Relative Intensity |
| --- | --- | --- |
| 6.0 | 14.7 | S |
| 7.5 | 11.7 | M |
| 14.6 | 6.1 | M |
| 18.1 | 4.9 | M |
| 19.5 | 4.5 | M |
| 21.2 | 4.2 | S |
| 22.1 | 4.0 | M |
| 22.5 | 3.9 | M |
| 24.3 | 3.7 | MW |
| 24.8 | 3.6 | MW |
| 26.2 | 3.4 | W |
| 28.3 | 3.15 | W |
| 29.8 | 3.0 | W |
| 32.4 | 2.8 | W |

The aluminosilicate molecular sieve of the present invention may be prepared by using a cobalt metal complex, such as bis(pentamethylcyclopentadienyl) cobalt (lll) ion [(Cp*)$_2$Co] or a bis(partially methylated cyclopentadienyl) cobalt (lll) ion having at least three methyl groups, as the directing agent.

The aluminosilicate molecular sieve of the present invention may be prepared from a reaction mixture containing a source of sodium ions and/or hydroxide ions such as NaOH or [(Cp*)$_2$Co]OH; a source of aluminum such as NaAlO$_2$, aluminum oxide or aluminum sulfate; a directing agent such as [(Cp*)$_2$Co] ion, in the form of [(Cp*)$_2$Co]OH or a chloride or other salt of [(Cp*)$_2$Co] ion; and a source of silica such as a pyrogenic silica (e.g., Cab-O-Sil M5), precipitated silicas, silica gels, silica sols, or soluble silicates (e.g., tetraethylorthosilicate) in the following mole ratios:

$H_2O/SiO_2$=20 to 80
$Na^+/SiO_2$=0 to 0.2
$OH^-/SiO_2$=0.1 to 0.3
$[(Cp^*)_2Co]/SiO_2$=0.05 to 0.2
$SiO_2/Al_2O_3$=75 to 600

The preferred mole ratios for $H_2O/SiO_2$ is from about 40 to 60; for $Na^+/SiO_2$, from about 0.05 to 0.15; for $OH^-/SiO_2$, from about 0.15 to 0.25; for [(Cp*)$_2$Co]/SiO$_2$, from about 0.05 to 0.15; and for SiO$_2$/Al$_2$O$_3$, from about 100 to 300.

Crystallization of the aluminosilicate molecular sieve from the above-described reaction mixture requires from about 2 to 50 days; at a temperature of from about 150 to 200° C.

The as-synthesized form of the aluminosilicate molecular sieve is then calcined at a temperature of about 300 to 400° C. in N$_2$, then at 500 to 550° C. in air to destroy the cobalt metal complex. The calcined molecular sieve may optionally be treated to remove sodium ions, e.g., with a solution of NH$_4^+$ ion.

The aluminosilicate molecular sieve prepared from the bis(pentamethylcyclopentadienyl) cobalt (lll) ion [(CP*)$_2$Co] directing agent has a nominal critical pore diameter of about 7.5 Å; an average crystal size of less than 2 microns, preferably ranging from 0.01 to 1.0 micron and more preferably ranging from 0.05 to 0.5 micron; an "a" unit cell dimension of greater than 18.83 Å; and an x-ray diffraction pattern that includes at least the lines set forth in Table 1 above. This embodiment of the aluminosilicate molecular sieve of the present invention is a 14-membered ring, aluminosilicate molecular sieve and is referred to hereinafter as MCM-64.

The following examples illustrate the preparation of MCM-64 using bis(pentamethylcyclopentadienyl) cobalt (lll) ion [(CP*)$_2$Co] as the directing agent.

EXAMPLE 1

The metal complex of [(Cp*)$_2$Co] was prepared as described in Example 1 of U.S. Pat. No. 5,489,424.

MCM-64 was prepared as a substantially single phase product by combining water, 50% NaOH, 47% NaAlO$_2$, 7% [(Cp*)$_2$Co]OH aqueous solution and silica, specifically Cab-O-Sil M-5, and stirring until well mixed. The mole ratio of the reactants were:

H$_2$O/SiO$_2$=60
Na$^+$/SiO$_2$=0.1
OH$^-$/SiO$_2$=0.2
[(Cp*)$_2$Co]/SiO$_2$=0.1
SiO$_2$/Al$_2$O$_3$=200

Crystallization of the aluminosilicate molecular sieve was carded out at a temperature of 175° C. in an unstirred, teflon-lined autoclave, and was deemed to be complete after approximately 28 days. FIG. 1 shows the characteristic x-ray diffraction pattern for this sample.

The off-yellow, as-synthesized form was then calcined, first at 350° C. in N$_2$, then at 538° C. in air to destroy the cobalt metal complex. The resultant blue powder was treated with NH$_3$ gas and then exchanged with 1M NH$_4$NO$_3$.

The unit cell dimensions of this MCM-64 sample were:

|  | a (Å) | b (Å) | c (Å) |
| --- | --- | --- | --- |
| MCM-64, as-synthesized | 18.866 | 8.382 | 23.533 |
| MCM-64, calcined | 18.989 | 8.410 | 23.144 |

The average crystal size of both the as-synthesized and calcined forms of this MCM-64 sample was less than about 1 micron.

The as-synthesized form of this MCM-64 sample, when examined by NMR, was found to have a framework SiO$_2$/Al$_2$O$_3$ ratio of approximately 160. All alumina in the sample was in the framework as shown by the single peak in FIG. 3.

EXAMPLE 2

MCM-64 was prepared as a substantially single phase product by combining water, 50% NaOH, 47% NaAlO$_2$, 9% [(Cp*)$_2$Co]OH aqueous solution and silica, specifically Cab-O-Sil M-5, and stirring until well mixed. The mole ratio of the reactants were:

H$_2$O/SiO$_2$=60
Na$^+$/SiO$_2$=0.1
OH$^-$/SiO$_2$=0.2
[(CP*)$_2$Co]/SiO$_2$=0.1
SiO$_2$/Al$_2$O$_3$=100

Figure 2:
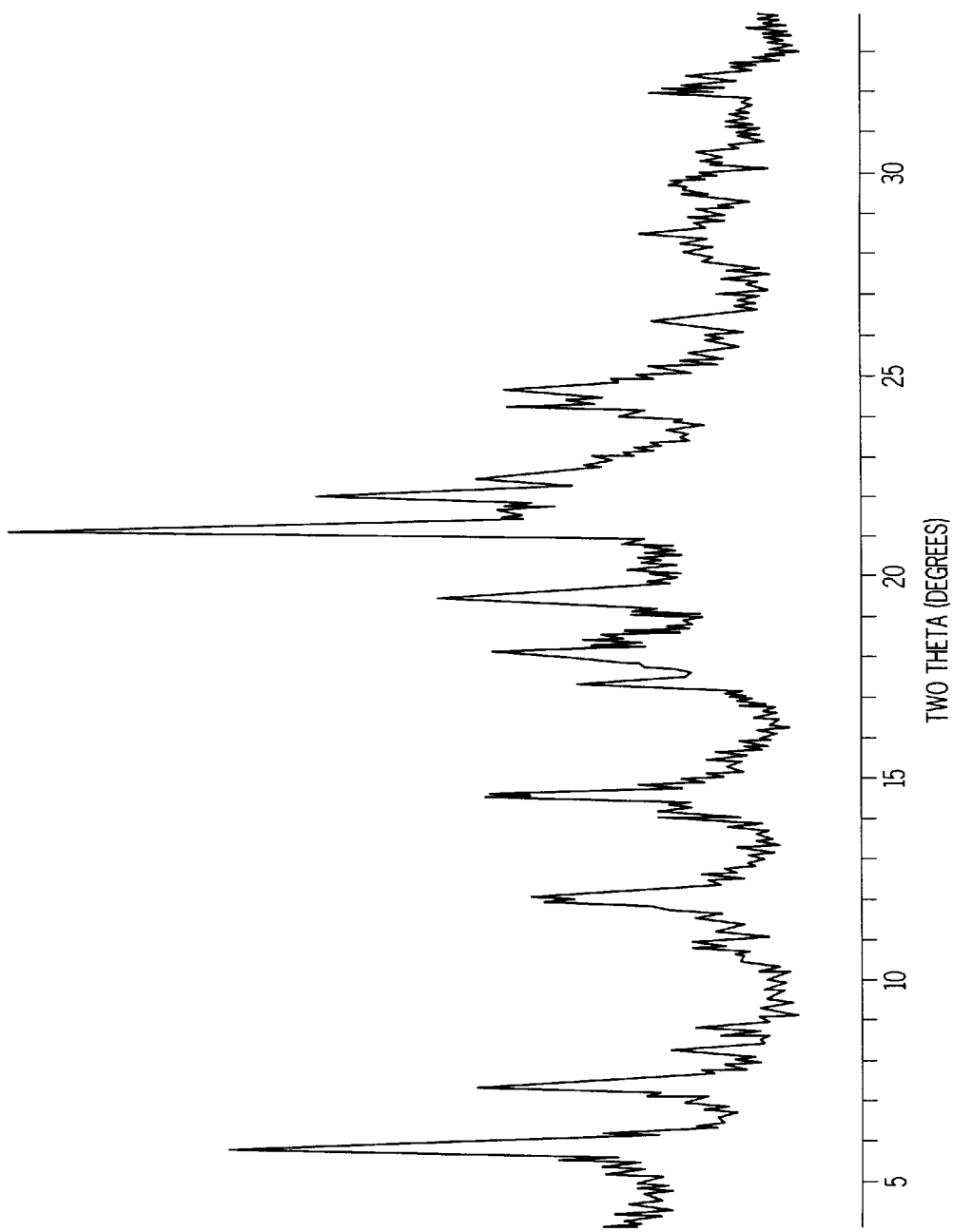
FIG. 2 is the X-ray diffraction pattern for the aluminosilicate molecular sieve of the present invention having a $SiO_2/Al_2O_3$ ratio of about 100, as-synthesized.

Crystallization of the aluminosilicate molecular sieve was carried out at a temperature of 175° C. in an unstirred, teflon-lined autoclave, and was deemed to be complete after approximately 35 days. FIG. 2 shows the characteristic x-ray diffraction pattern for this sample.

The off-yellow, as-synthesized form was treated as described in Example 1. The average crystal size of this MCM-64 sample was about 1 micron.

COMPARATIVE EXAMPLE

An attempt was made to prepare an aluminosilicate molecular sieve where the mole ratios of the reactants were the same as in Examples 1 and 2, except that the mole ratio of SiO$_2$/Al$_2$O$_3$ was about 50. Crystallization of a molecular sieve was unsuccessful after six weeks at 347° C.

EXAMPLE 3

The aluminosilicate molecular sieve of Example 1, after calcination and removal of sodium ions, was tested for activity. Specifically, activity was confirmed in a test reaction with toluene. At 470° C., toluene conversion was 7.5% to benzene and a mixture of xylenes. The presence of higher molecular weight compounds in the product demonstrated the ability to convert toluene via disproportionation.

What is claimed is:

1. A method of preparing an aluminosilicate molecular sieve that comprises alumina and silica in a ratio of SiO$_2$/Al$_2$O$_3$ ranging from about 75 to 600, said molecular sieve having an x-ray diffraction pattern that includes at least the d-spacing lines set forth in Table 1, said method comprising the step of (1) combining water, a source of hydroxide ions, a source of alumina, a source of [(Cp*)$_2$Co] ions and a source of silica in the following ratios:
   H$_2$O/SiO$_2$=20 to 80
   Na$^+$/SiO$_2$=0 to 0.2
   OH$^-$/SiO$_2$=0.1 to 0.3
   [(Cp*)$_2$Co]/SiO$_2$=0.05 to 0.2
   SiO$_2$/Al$_2$O$_3$=75 to 600
   and (2) crystallizing the aluminosilicate molecular sieve for about 2 to 50 days and at a temperature of from about 150 to 200° C.

* * * * *